(12) United States Patent
Gao et al.

(10) Patent No.: US 9,285,135 B2
(45) Date of Patent: Mar. 15, 2016

(54) METHOD FOR REGULATING ROOM COMFORT VARIABLES

(75) Inventors: Tianyun Gao, Beijing (CN); Markus Gwerder, Steinhausen (CH); Benedikt Schumacher, Meilen (CH); Marcel Walti, Staufen (CH)

(73) Assignee: SIEMENS SCHWEIZ AG, Zürich (CH)

( * ) Notice: Subject to any disclaimer, the term of this patent is extended or adjusted under 35 U.S.C. 154(b) by 490 days.

(21) Appl. No.: 13/049,635

(22) Filed: Mar. 16, 2011

(65) Prior Publication Data

US 2011/0230131 A1   Sep. 22, 2011

(30) Foreign Application Priority Data

Mar. 16, 2010 (EP) .................................... 10156666

(51) Int. Cl.
 *F24F 11/00* (2006.01)
 *G05D 23/19* (2006.01)
(52) U.S. Cl.
 CPC ........... *F24F 11/0017* (2013.01); *F24F 11/006* (2013.01); *G05D 23/1919* (2013.01); *F24F 2011/0073* (2013.01); *Y02B 30/78* (2013.01)
(58) Field of Classification Search
 CPC .................................................. F24F 11/0017
 USPC .................................. 454/239, 256; 700/276
 See application file for complete search history.

(56) References Cited

U.S. PATENT DOCUMENTS

| | | | |
|---|---|---|---|
| 4,164,172 A | | 8/1979 | Anderten et al. |
| 4,189,094 A | * | 2/1980 | Robinson ..................... 236/46 R |
| 5,292,280 A | * | 3/1994 | Janu et al. ...................... 454/229 |
| 5,803,804 A | * | 9/1998 | Meier et al. ................... 454/256 |
| 5,850,968 A | * | 12/1998 | Jokinen ........................ 236/44 C |
| 5,950,442 A | * | 9/1999 | Maeda et al. .................... 62/175 |
| 5,976,010 A | * | 11/1999 | Reese et al. ..................... 454/229 |
| 6,439,469 B1 | * | 8/2002 | Gruber et al. ................. 237/8 R |
| 7,512,450 B2 | * | 3/2009 | Ahmed ............................ 700/19 |
| 7,548,833 B2 | * | 6/2009 | Ahmed .......................... 702/188 |
| 7,610,910 B2 | * | 11/2009 | Ahmed .......................... 126/595 |
| 7,632,178 B2 | * | 12/2009 | Meneely, Jr. .................. 454/239 |
| 7,854,389 B2 | * | 12/2010 | Ahmed ....................... 236/44 C |

(Continued)

FOREIGN PATENT DOCUMENTS

| | | |
|---|---|---|
| EP | 0 416 488 A2 | 3/1991 |
| EP | 0 851 179 A2 | 7/1998 |

(Continued)

OTHER PUBLICATIONS

Chinese Office Acton mailed Nov. 4, 2013 in corresponding Chinese Application No. 201110063045.X.

*Primary Examiner* — Steven B McAllister
*Assistant Examiner* — Jonathan Cotov
(74) *Attorney, Agent, or Firm* — Staas & Halsey LLP

(57) ABSTRACT

An appropriately treated flow of air is supplied to a room in an automatically executed pulsed operation, in which the air flow is alternately switched on and switched off. The air flow is switched off independently of the room usage state if the regulated room comfort variables lie within a respectively assigned comfort band. If at least one of the regulated room comfort variables lies outside the comfort band assigned to it, the flow of air minimized in respect of its volume is supplied to the room. This means that ventilators used for the exchange of air will be operated at the lowest possible speed, optimized in respect of time and thereby with high energy efficiency.

10 Claims, 3 Drawing Sheets

(56) References Cited

U.S. PATENT DOCUMENTS

| | | | |
|---|---|---|---|
| 8,066,558 B2* | 11/2011 | Thomle et al. | 454/256 |
| 2002/0090908 A1* | 7/2002 | Estepp | 454/236 |
| 2003/0013407 A1* | 1/2003 | Gagnon et al. | 454/237 |
| 2003/0181158 A1* | 9/2003 | Schell et al. | 454/229 |
| 2004/0144849 A1* | 7/2004 | Ahmed | 236/1 E |
| 2005/0234596 A1* | 10/2005 | Rietschel | 700/276 |
| 2007/0043478 A1* | 2/2007 | Ehlers et al. | 700/276 |
| 2007/0084937 A1* | 4/2007 | Ahmed | 236/44 C |
| 2007/0168084 A1* | 7/2007 | Cheng | 700/276 |
| 2008/0161976 A1* | 7/2008 | Stanimirovic | 700/276 |
| 2009/0234506 A1* | 9/2009 | Gwerder et al. | 700/278 |
| 2010/0057258 A1* | 3/2010 | Clanin | 700/276 |
| 2011/0153088 A1* | 6/2011 | Gwerder et al. | 700/276 |

FOREIGN PATENT DOCUMENTS

| | | |
|---|---|---|
| EP | 10156666 | 3/2010 |
| WO | 2007/027632 A2 | 3/2007 |
| WO | 2009/103563 A1 | 8/2009 |

\* cited by examiner

METHOD FOR REGULATING ROOM COMFORT VARIABLES

CROSS REFERENCE TO RELATED APPLICATIONS

This application is based on and hereby claims priority to European Application No. 10156666 filed on Mar. 16, 2010, the contents of which are hereby incorporated by reference.

BACKGROUND

Described below is a method suitable for heating, cooling and ventilating rooms with the aid of the supply of appropriately pretreated air, wherein prespecified quality criteria for certain room comfort variables are able to be met and energy costs are still able to be minimized.

A plurality of such methods for reducing energy costs is known from specialist and patent literature. A predictive device for closed-loop or open-loop control of supply variables of a building is known from EP 1 074 900 A. A cost function having comfort and energy terms is able to be minimized with the proposed device. An arrangement for optimum control of the use of at least one free energy source is known from WO 2007/042371 A. In WO 2007/042390 A it is proposed that the uncertainty in the knowledge of the internal and external heat gains in a building be taken into account in a closed-loop control strategy for room climate variables. WO 2007/096 377 A discloses a method for predictive open-loop control and/or closed-loop control of at least one energy system of a building having a power-heat coupling device. Methods are also presented in EP851 179 A and WO 2009/103 563 A for heating, cooling and ventilating rooms with the aid of the supply of appropriately conditioned air through which energy costs are also able to be reduced.

SUMMARY

An aspect is to create a method for heating, cooling and ventilating rooms, enabling pre-specified quality criteria for certain room comfort variables to be adhered to and energy costs to be minimized. The system should be able to be employed to good effect in systems with which both just one single room and also a number of rooms of a building are to be air-conditioned by supplied and appropriately treated air.

BRIEF DESCRIPTION OF THE DRAWINGS

These and other aspects and advantages will become more apparent and more readily appreciated from the following description of the exemplary embodiments, taken in conjunction with the accompanying drawings of which.

DETAILED DESCRIPTION OF THE PREFERRED EMBODIMENT

Figure 1:
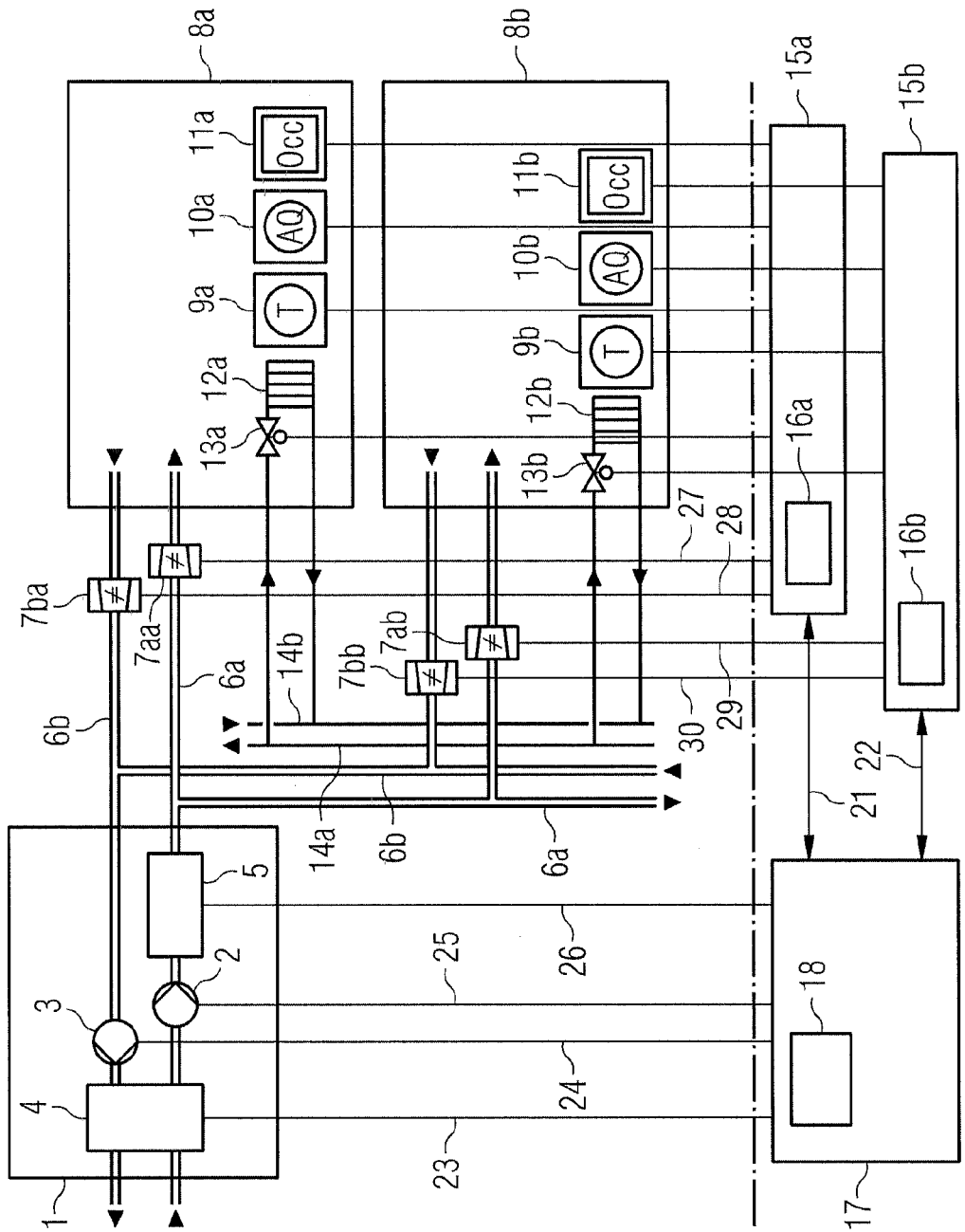
FIG. 1 is a block diagram of a system for heating, cooling, ventilating and air conditioning of a number of rooms.

Reference will now be made in detail to the preferred embodiments, examples of which are illustrated in the accompanying drawings, wherein like reference numerals refer to like elements throughout.

In FIG. 1 the number 1 indicates a so-called primary ventilation system which typically has an inlet air ventilator 2, an exhaust air ventilator 3, a device 4 for energy recovery and a further device 5 for air treatment.

The primary ventilation plant 1 supplies connected rooms 8a and 8b with treated air via an inlet air duct 6a, with air being extracted via an exhaust air duct 6b from the connected rooms 8a and 8b.

The device 4 for energy recovery typically includes a heat exchanger and if necessary further systems for air treatment, for example particle filters, or systems for feeding back at least a part of the exhaust air from the exhaust air duct 6b into the inlet duct 6a. Thus if necessary moisture can be fed back from the exhaust air duct 6b into the inlet duct 6c.

The further device 5 for air treatment typically includes systems for heating or cooling inlet air fed into the inlet air duct 6a. If necessary the device 5 for air treatment also has available to it other systems for air treatment, for example for cleaning, dehumidifying or humidifying.

Basically the number of rooms connected via the inlet air duct 6a and the exhaust air duct 6b to the primary ventilation system 1 for the method presented here for regulation of room comfort variables is not significant and can thus vary within wide limits. The method is thus suitable for a single room and also for fifty rooms for example. In order to achieve a detailed and yet still general representation of an exemplary embodiment, only two rooms 8a and 8b are shown in FIG. 1. For an individual room inlet air and exhaust air are typically able to be exchanged via a facade ventilation device not shown in FIG. 1, with the regulation method for regulating room comfort variables able to be applied here in the individual room.

It goes without saying that the reference to room in this text can also mean a zone or room zone, consequently nomenclature such as room and/or zone is dispensed with.

The volume flow of the inlet air supplied to the room 8a or 8b is able to be regulated via at least one air flap in each case. Advantageously the volume flow of the air supplied to the first room 8a is able to be regulated via a first air flap 7aa arranged in the inlet air duct 6a and a second air flap 7ba arranged in the exhaust air duct 6b. In the same way the volume flow of the air supplied to the second room 8b is advantageously able to be regulated via a third air flap 7ab in the inlet air duct 6a and a fourth air flap 7bb arranged in the exhaust air duct 6b.

The four air flaps 7aa, 7ba, 7ab and 7bb are advantageously flaps or valves able to be controlled continuously, of which the transition from a closed state in an open state is continuously variable through a corresponding control signal.

In further advantageous variants of the system for heating, cooling, ventilating and air-conditioning of rooms the system includes additional systems for heating or cooling the rooms. As an example of these types of variant a heating supply pipe 14a and a heating return pipe 14b of an additional heating system is shown in FIG. 1. Arranged in the first room 8a is a radiator 12a able to be controlled via a first radiator valve 13a and connected to the heating supply pipe 14a and the heating return pipe 14b. In the same manner a second radiator 12b able to be controlled via a second radiator valve 13b is arranged in the second room 8b and is connected to the heating supply pipe 14a and the heating return pipe 14b. For open-loop and/or closed-loop control of the additional heating system the first radiator valve 12a is connected via a first at least unidirectionally configured control line 19a to a first open-loop and closed-loop control device 15a and the second radiator valve 12b is connected via a second at least unidirectionally configured control line 19b to the second open-loop and/or closed-loop control device 15b.

In a further variant of the system, additional systems for cooling, for example cooled ceilings, are arranged in rooms 8a and 8b. Basically the method proposed here for regulating the at least one room comfort variable is easily able to be adapted beneficially by a person skilled in the art to suitable systems for heating, cooling, ventilation and air conditioning of rooms, with the design of the systems able to be varied within wide limits.

The method proposed here for regulating at least one room comfort variable in at least one room is advantageously able to be carried out by a first closed-loop and open-loop control device 15a or a second closed-loop and open-loop control device 15b assigned respectively to the room 8a or 8b and a third closed-loop and open-loop control device 17 assigned to the primary ventilation system 1. Advantageously a first regulated room comfort variable is the room temperature in each of the supplied rooms. Further room comfort variables are regulated as required, for example a measure for the air humidity or a variable qualifying the air quality such as the carbon dioxide content, the content of volatile organic compounds VOC, particles or pollutants for example. The first and second closed-loop and open-loop control device 15a or 15b included in the proposed method basically effect a closed-loop control for regulating the intended room comfort variables. For the purposes of the closed-loop control method sensors required for measuring the intended room comfort variables are arranged in each case in the supplied rooms 8a and 8b and connected for transfer of measured values to the assigned closed-loop and open-loop control device 15a or 15b wirelessly or by wire.

Typically a first room temperature sensor 9a, a first air quality sensor 10a and a first room occupancy status detector 11a are arranged in the first room 8a and are connected for transmission of energy and/or information to a first closed-loop and open-loop control device 15a in each case. In addition a second room temperature sensor 9b, a second air-quality sensor 10p and a second room occupancy status detector 11b are arranged in the second room 8b and connected for transmission of energy and/or information to the second open-loop and closed-loop control device 15a in each case.

To carry out the method for regulating at least one room comfort variable, the first closed-loop and open-loop control device 15a advantageously has a first the pulsed operating module 16a. In addition the second closed-loop and open-loop control device 15b has a second pulsed operating module 16b. In addition the third closed-loop and open-loop control device 17 for carrying out the method for regulating at least one room comfort variable advantageously has a coordination module 18 for coordination of the air demand in the primary ventilation system 1 requested for the connected rooms 8a and 8b.

To carry out the method for regulating the room comfort variables, the third closed-loop and open-loop control device 17 is connected via wired or wireless—advantageously bidirectional—data communication channels to the first closed-loop and open-loop control device 15a and to the second closed-loop and open-loop control device 15b on one side and to the primary ventilation system 1 on the other side. The data communication channels are shown by way of example in FIG. 1 by a first data communication channel 21 connecting the third open-loop and closed-loop control device 17 to the first open-loop and closed-loop control device 15a, by a second data communication channel 22 connecting the third open-loop and closed-loop control device 17 to the first open-loop and closed-loop control device 15b, by a third data communication channel 23 connecting the third open-loop and closed-loop control device 17 to the device 4 for energy recovery, by a fourth data communication channel 24 connecting the third open-loop and closed-loop control device 17 to the exhaust air ventilator 3, by a fifth data communication channel 25 connecting the third open-loop and closed-loop control device 17 to the inlet air ventilator 2 and by a sixth data communication channel 26 connecting the third open-loop and closed-loop control device 17 to the device 5 for air treatment.

To carry out the method for regulating the room comfort variables, the first and the second open-loop and closed-loop control unit 15a and 15b are connected through further wired or wireless—advantageously bidirectional—data communication channels to the assigned drives of the air flaps for volume flow regulation. The data communication channels are shown by way of example in FIG. 1 by a seventh data communication channel 27 connecting the first open-loop and closed-loop control device 15a to the first air flap 7aa, by an eighth data communication channel 28 connecting the first open-loop and closed-loop control device 15a to the second air flap 7ba, by a ninth data communication channel 29 connecting the second open-loop and closed-loop control device 15b to the third air flap 7ab and by a tenth data communication channel 30 connecting the second open-loop and closed-loop control device 15b to the fourth air flap 7bb. In an advantageous implementation of the system the ten data communication channels 21, 22, 23, 24, 25, 26, 27, 28, 29, 30 are implemented by a bus system, advantageously in accordance with a standard, for example in accordance with BACnet or KNX.

An implementation of the three closed-loop and open-looped control devices 15a, 15b, and 17 typically includes an appropriately programmed microcomputer system, which as a rule includes a number of devices based on microprocessors and/or microcomputers. The microcomputer system may include permanent or removable storage, such as magnetic and optical discs, RAM, ROM, etc. on which machine instructions and data structures to implement the method can be stored and distributed.

The aim of the method proposed here for regulating at least one room comfort variable is to keep the energy necessary for changing the air in the room or rooms respectively as low as possible. Therefore all volume flows of inlet air and exhaust air are explicitly adapted to the requirements of the supplied rooms. For heating or cooling requirements the aim is therefore to meet the requirements without increasing the volume flow, for example by changing the inlet air temperature or by the radiators 12a or 12b (FIG. 1). Only when the demand can no longer be covered by changing the inlet air temperature or by the use of an available additional system, for example if the inlet air temperature has reached a maximum or a minimum setpoint value, is the volume flow increased.

If a minimum volume flow of inlet air or exhaust air is reached in the room and if the monitored room comfort variables are within the desired comfort bands, advantageously the volume flows supplying the room of the inlet air and the exhaust air are suppressed by completely closing the corresponding flaps. If one of the monitored room comfort variables is outside the desired comfort band, advantageously the minimum volume flow is switched on by corresponding opening of the flaps of the inlet air and the exhaust air. This leads to pulsed operation of the inlet air and exhaust air by which the energy necessary for changing the air in the room or in the rooms respectively is able to be significantly reduced.

A significant feature of the method presented here for regulating a room comfort variable in room 8a or 8b is thus the supply of an air flow into the room in a so-called pulsed operation in which the air flow, independently of a room usage status, is automatically alternately switched on and switched off in accordance with prespecified rules. The air flow is switched off if the regulated room comfort variables lie within a respectively assigned comfort band. If at least one regulated room comfort variable lies outside the comfort band assigned to it the air flow is switched on, to effect a necessary change to the current value of the room comfort variable, by the air flow minimized in respect of volume flow being supplied to the room, with the air flow being prepared by the primary ventilation system 1 such that the volume flow of the supplied air flow is minimized. The supply of the air flow in rule-based pulsed operation is advantageously implemented by a corresponding programming of the pulsed operation modules 16a and 16b and of the coordination module 18.

The fact that the pulsed mode is used independently of a room usage status, determined for example by the room occupancy status detector 11a or 11b, means that the energy used for circulating air will be minimized even if the room 8a or 8b is not occupied.

In variants of the pulsed operation the air flow is switched off as a function of time or depending on the energy gains in the room 8a or 8b respectively.

Figure 2:
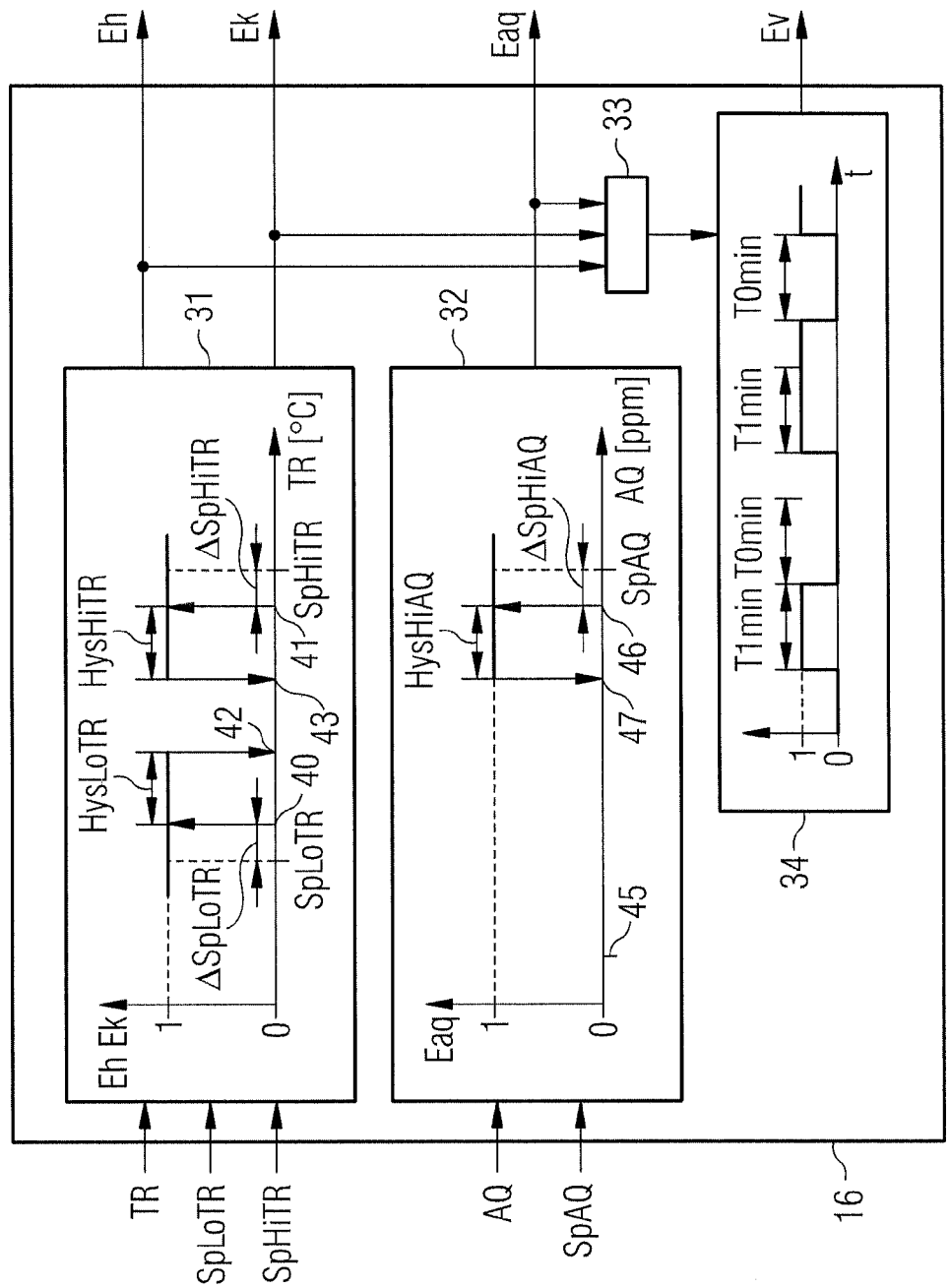
FIG. 2 is a block diagram of a module of a device for closed-loop and open-loop control of room climate variables with the aid of the system.

FIG. 2 shows a block diagram and also an action plan of the pulsed operation module 16. The pulsed operation module 16 advantageously includes a function block for each regulated room comfort variable. In an advantageous embodiment of the function block, an inner comfort band, an outer comfort band and a central comfort band are defined for the assigned room comfort variables, with the two limit values of the central comfort band lying at a coordinate within the outer comfort band assigned to one of the room comfort variables and with the two limit values of the inner comfort band lying at the coordinates within the central comfort band.

On the one hand the function block then allows the minimized volume flow to be switched off if a value determined for the room comfort variable lies in the inner comfort band. On the other hand the function block demands that the minimized volume flow be switched on if the value determined for the room comfort variable reaches the central comfort band. For example the allowing of the switching off of the minimized volume flow is shown in the diagram by a logical "0" while the demand for switching on the minimized volume flow is represented by a logical "1". The valid status logical "0" or logical "1" is typically determined by the function blocks using a signal to the logical operation block 33 and to the first or second closed-loop and open-loop device 15a or 15b responsible.

In an advantageous embodiment of the first or second closed-loop and open-loop control device 15a or 15b respectively, the minimized volume flow is supplied to the corresponding room if at least one of the function blocks of the corresponding pulsed operation module 16 assigned to the room demands that the minimized volume flow be switched on. Advantageously the minimized volume flow applied to the room is however only switched off when all function blocks assigned to the room allow the minimized volume flow to be switched off. The actual switching on or switching off of the volume flow supplied to the room 8a or 8b is brought about by the first or second closed-loop and open-loop control device 15a or 15b respectively by activating the corresponding air flaps 7aa, 7ab, 7ba and 7bb, with information about respective flap settings and volume flows also advantageously being forwarded to the coordination module 18.

Typically the pulsed operation module 16 shown in FIG. 2 optimizes the room comfort variables room temperature TR and air quality AQ and thus includes a first function block 31 controlling the behavior of the temperature regulation and a second function block 32 controlling the behavior of the regulation of an air quality variable. Advantageously the pulsed operation module 16 also has a logical operation block 33 and a release block 34.

To optimize the temperature regulation in function block 31, at a coordinate assigned to the room temperature TR, an outer comfort band is defined by a lower setpoint temperature value SpLoTR and an upper setpoint temperature value SpHiTR. To optimize the temperature regulation a central comfort band defined by a lower switch-on threshold 40 and an upper switch-on threshold 41 and an inner comfort band defined by a lower switch-off threshold 42 and an upper switch-off threshold 43 are also advantageously determined at the coordinates assigned to the room temperature TR.

On the one hand the function block 31 allows the minimized volume flow to be switched off if a value established for the room temperature TR lies in the inner comfort band. On the other hand the function block 31 demands that the minimized volume flow be switched on if the value established for the room temperature TR reaches the central comfort band. For example the allowing of the switching-off of the minimized volume flow is shown in the diagram of function block 31 by a logical "0", while the demanding of the switching-on of the minimized volume flow is shown by a logical "1". The valid state logical "0" or logical "1" is signaled by function block 31 for example by a first enabling signal Eh for the volume flow conditioned for heating and by a second enabling signal Ek for the volume flow conditioned for cooling. The first enabling signal Eh and the second enabling signal Ek are transferred to the logical operation block 33 and to the first or second closed-loop or open-loop control device 15a or 15b responsible.

To optimize the regulation of an air quality variable an outer comfort band is defined in function block 32 at a coordinate assigned to the air quality variable AQ by a lower threshold value 45 and a setpoint air quality value SpAQ. To optimize the regulation of the air quality variable a central comfort band defined by the lower threshold value 45 and a switch-on threshold 46 and an inner comfort band defined by the lower threshold 45 and a switch-off threshold 47 are also advantageously established at a coordinate assigned to the air quality variable AQ.

On the one hand function block 32 allows switching off of the minimized volume flow if a value determined for the air quality variable AQ lies in the inner comfort band. On the other hand the function block 32 demands that the minimized volume flow be switched on if a value determined for the air quality variable AQ reaches the central comfort band. For example the allowing of the switching off of the minimized volume flow is shown by a logical "0" in the diagram of function block 32 while the demand for switching on the minimized volume flow is shown by a logical "1". The valid state logical "0" or logical "1" is transferred for example by function block 32 via a third release signal Eaq to the logical operation block 33 and to the respective first or second closed-loop and open-loop control device 15a or 15b responsible.

The logical operation block 33 generates in an output signal transferred to the enabling block 34 the information as to whether at least one of the three enabling signals Eh, Ek or Eaq is demanding that the minimized volume flow be switched on. In the enabling block 34, on the basis of the information of the output signal transferred from the logical operation block 33, a fourth, time-dependent enabling signal Ev is generated. Basically the fourth enabling signal is generated so that the switching off of the minimized volume flow is allowed if none of the three enabling signals Eh, Ek or Eaq generated by the two functional blocks demands that the minimized volume flow be switched on, in which case, as additional conditions, a minimal impulse time T1min for the signal value logical "1", and a minimal pause time T0min for the signal value logical "0" are to be adhered to. The fourth enabling signal Ev is typically transferred to the responsible first or second closed-loop and open-loop control device 15a or 15b respectively.

For each regulated room comfort variable an actual value of the room comfort variable determined in the assigned room 8a or 8b respectively is transferred to the corresponding function blocks 31 or 32 respectively and advantageously also information about at least one comfort band desired for the room comfort variables. For example the room temperature TR, the lower setpoint temperature value SpLoTR and the upper setpoint temperature value SpHiTR determined for the assigned room are transferred to the first function block 31. In addition the value of the air quality variable AQ and also the setpoint air quality value SpAQ are transferred to the second function block 32 for the assigned room.

The closed-loop and open-loop control device 15a or 15b respectively assigned to the room 8a or 8b respectively (FIG. 1) advantageously generate a volume flow setpoint value VSp dependent on the room temperature TR established in the corresponding room.

Figure 3:
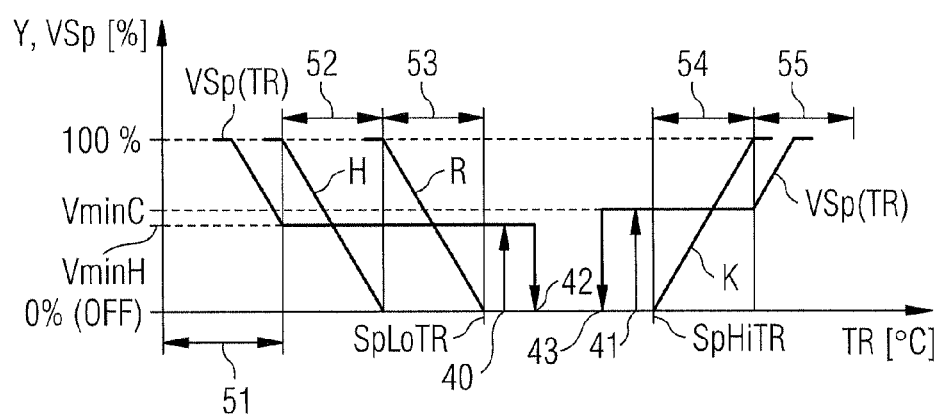
FIG. 3 is a diagram showing the functioning of the device for closed-loop and open-loop control of room climate variables.

Shown in FIG. 3 is a typical basic graph VSp(TR) of the volume flow setpoint value VSp as a function of the room temperature TR. The room temperature TR is assigned to the coordinates at which characteristic values already described in conjunction with FIG. 2 are entered, namely the lower setpoint temperature value SpLoTR, the upper setpoint temperature value SpHiTR, the lower switch-on threshold 40, the upper switch-on threshold 41, the lower switch-off threshold 42 and the upper switch-off threshold 43.

Starting from a lower value of the room temperature, the maximum volume flow setpoint value VSp designated here by 100% is minimized in a first temperature range 51 to the minimum volume flow setpoint value VminH defined for heating. In a second temperature range 52 and a third temperature range 53 the minimum volume flow setpoint value VminH related to the heating is retained. In the outer comfort band adjoining the third temperature range 53 the minimum volume flow setpoint value VminH related to the heating is set to zero in accordance with the rules described in FIG. 2 for the lower switch-off threshold 42 and, after any reduction of the room temperature TR to the lower switch-on threshold 40, is again set to the minimum volume flow threshold value defined for the heating. If the room temperature TR in the outer comfort band rises to the upper switch-on threshold 41 the volume flow setpoint value VSp is increased from 0 to the minimum volume flow setpoint value VminC defined for cooling, with the minimum volume flow setpoint value VminC defined for cooling being retained in a fourth temperature range 54 above the outer comfort band and in a subsequent fifth temperature range 55 being set to the maximum volume flow setpoint value VSp designated by 100%. If during cooling the value of the room temperature TR in the central comfort band falls below the upper switch-off threshold 43, the volume flow setpoint value VSp is set to zero.

The minimum volume flow setpoint value VminC applicable during cooling and the minimum volume flow setpoint value VminH applicable during heating can basically differ in size and if necessary depend on further measured values, for example the temperature of the inlet air or the room temperature TR.

H shows a curve of a heat requirement message basically dependent on the room temperature which typically falls in the second temperature range 52 as the room temperature TR increases from a maximum value designated by 100% towards 0%. In an advantageous embodiment variant of the first and/or second closed-loop and open-loop control device 15a or 15b, a heating requirement message corresponding to the room temperature TR established is transferred to the primary ventilation system 1. The result able to be achieved by this is that the temperature of the air supplied via the inlet air duct 6a is able to be changed for the minimized volume flow.

K shows a curve of a heat requirement message basically dependent on the room temperature which typically rises in the fourth temperature range 54 as the room temperature TR increases from a minimum value designated by 0% towards 100%. In an advantageous embodiment variant of the first and/or second closed-loop and open-loop control device 15a or 15b the heating requirement message corresponding to the room temperature established is transferred to the primary ventilation system 1. The result able to be achieved by this is that the temperature of the air supplied via the inlet air duct 6a is able to be changed for the minimized volume flow.

R shows a curve of a control signal basically dependent on the room temperature for a radiator valve arranged in the corresponding room, which typically falls in the third temperature range 53 as the room temperature TR increases from a maximum value designated by 100% towards 0%. In an advantageous embodiment variant of the first and/or second closed-loop and open-loop control device 15a or 15b, a control signal corresponding to the room temperature TR established is transferred to the radiator valve. The result able to be achieved by this is that the room temperature TR is also able to be varied using supplementary heating for a minimized volume flow.

FIG. 3 shows a stationary regulation behavior for regulation elements with a purely proportional behavior (I behavior). Typically regulation elements are used which are capable of eliminating the stationary regulation errors, for example by integrating behavior (I behavior). The five temperature ranges 51, 52, 53, 54 and 55 shown in FIG. 3 outside the outer comfort band would then all have a width of zero.

Figure 4:
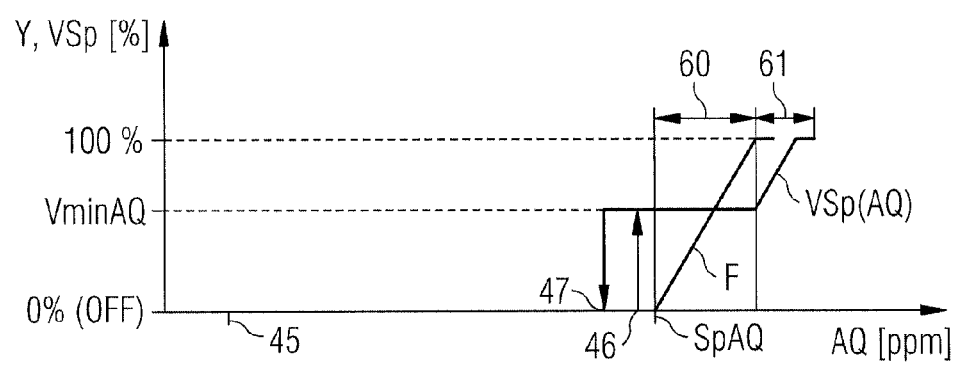
FIG. 4 is a further diagram showing the functioning of the device for closed-loop and open-loop control of room climate variables.

FIG. 4 shows a typical basic curve VSp(AQ) of the volume flow setpoint value VSp as a function of an air quality variable AQ able to be measured as a particle ratio (parts per million, ppm). The air quality variable AQ is assigned the coordinates at which characteristic values already described in conjunction with FIG. 2 are entered, namely the air quality setpoint value SpAQ, the lower threshold value 45, the switch-on threshold 46 and the switch-off threshold 47.

If the value for the air quality variable AQ in the comfort band delimited by the lower threshold value 45 and the air quality setpoint value SpAQ increases to the switch-on threshold 46, the volume flow setpoint value VSp is increased from zero up to a minimum volume flow threshold value VminAQ defined for the supply of fresh air, with the minimum volume flow threshold value VminAQ defined for the supply of fresh air being retained in a first air quality range 60 above the outer comfort band and in a subsequent second air quality range 61 adjoining the first air quality range 60 being set to a maximum volume flow threshold value VSp designated by 100%. If the value of the air quality variable AQ in the central comfort band falls below the switch-off threshold 47, the volume flow setpoint value VSp is set to zero.

F shows a curve of a fresh air requirement message basically dependent on the air quality variable AQ which for example rises in the first air quality range 60 as the temperature increases from a minimum value designated by 0% towards 100%. In an advantageous embodiment variant of the first and/or second closed-loop and open-loop control device 15a or 15b respectively, a fresh air requirement message corresponding to the value of the air quality variable AQ determined is transferred to the primary ventilation system 1. The result that can be achieved by this is that the proportion of fresh air of the air supplied via the inlet duct 6a is able to be changed for the minimized volume flow.

FIG. 4 shows a stationary regulation behavior for regulation elements with a purely proportional behavior (P behavior). Typically regulation elements are used which are capable of eliminating the stationary regulation errors, for example by integrating behavior (I behavior). The two air quality ranges 60 and 61 shown in FIG. 4 outside the outer comfort band would then both have a width of zero.

In an advantageous development of the method for regulating at least one room comfort variable in at least one of the rooms 8a or 8b, if an actual value of the room comfort variable established by the first or second close-loop control and open-loop control device 15a or 15b lies outside the corresponding central comfort band, the setpoint value of the primary ventilation system 1 related to the room comfort variable of the supplied air flow is significantly changed by a signal of the first or second closed-loop and open-loop control device 15a or 15b and the accelerated displacement of the actual value of the room comfort variable into the inner comfort band is able to be effected. The setpoint value is typically significantly changed if it is set roughly in the middle of the inner comfort band.

In a further advantageous development of the method for regulating at least one room comfort variable in at least one of the rooms 8a or 8b, if an actual value of the room comfort variable established by the first or second closed-loop and open-loop control device 15a or 15b for the room 8a or 8b lies outside the corresponding central comfort band, a setpoint value related to the room comfort variable of the supplied air flow of an air postprocessing module assigned to the room 8a or 8b and advantageously connected downstream from the first air flap 7aa or third air flap 7ab is significantly changed by a signal of the corresponding first or second closed-loop and open-loop control device 15a or 15b and is set to a predetermined value such that an accelerated displacement of the actual value of the room comfort variable into the inner comfort band is able to be effected. The setpoint value is typically significantly changed if it is set roughly in the middle of the inner comfort band. The air postprocessing module is for example an afterheater.

In a further advantageous development of the method for regulating at least one room comfort variable in at least one of the rooms 8a or 8b, if an actual value of the room comfort variable established by the first or second closed-loop and open-loop control device 15a or 15b for the room 8a or 8b lies outside the corresponding central comfort band, for accelerated displacement of the actual value of the room comfort variable into the inner comfort band, the value of the room comfort variable is changed such that the desired acceleration occurs but a permissible threshold value is not overshot or undershot respectively. So that for example the value of the temperature in the air flow supplied to the room 8a or 8b does not exceed a maximum allowable supply air temperature or a maximum allowable humidity, or does not undershoot a minimum allowable inlet air temperature or a minimum allowable humidity.

Advantageously monitored room comfort variables are basically regulated by the first and second closed-loop and open-loop control device 15a or 15b independently of the functioning of the pulsed operation module 16 into the outer comfort band defined for the corresponding room comfort variable.

The first closed-loop and open-loop control device 15a (FIG. 1) and the second closed-loop and open-loop control device 15b advantageously includes in each case a version 16a or 16b respectively of the pulsed operation module 16.

In an advantageous version of the system the first closed-loop and open-loop control device 15a and the second closed-loop and open-loop control device 15b supply the necessary information for optimum operation of the primary ventilation system 1 over the first data communication channel 21 for the second data communication channel 22 respectively to the third closed-loop and open-loop control device 17. The information advantageously includes current settings of the air flaps 7aa, 7ab, 7ba and 7bb and/or current actual and setpoint values of the volume flows through the air flaps 7aa, 7ab, 7ba and 7bb. Through the use of the information the inlet air ventilator 2 and the exhaust air ventilator 3 can be operated such that the volume flow setpoint values of the supplied rooms 8a and 8b can be achieved with the lowest possible speed and thus with high energy efficiency. If none of the supplied rooms 8a and 8b demands a volume flow or if none of the volume flow setpoint values is greater than zero, the inlet air ventilator 2, the exhaust air ventilator 3, the device 5 for air treatment and the device 4 for energy recovery are switched off.

Existing ventilation systems in which the necessary data points or interfaces for the incorporation of the pulsed operation module 16a or 16b are available can be equipped with the method by additional software. With a BACnet solution, to give one example here, it is often the case that the necessary data points are available via a data bus.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in *Superguide v. DIRECTV*, 358 F3d 870, 69 USPQ2d 1865 (Fed. Cir. 2004).

What is claimed is:

1. A method to regulate at least one room comfort variable in at least one room using an air flow supplied via an inlet air duct, comprising:

supplying, by a primary ventilation system, the air flow minimized in respect of volume flow;

regulating a room comfort variable by a regulator device in a comfort band assigned to the room comfort variable; and controlling supply of the air flow, from the primary ventilation system to the room, in an automatically executed pulsed operation in which the air flow is alternately switched on and switched off, the air flow supplied to the room being switched off when the room comfort variable lies within the comfort band assigned thereto, and the air flow supplied to the room being switched on when at least one out-of-band room comfort variable lies outside the comfort band assigned thereto, to bring about a required change to the at least one out-of-band room comfort variable, wherein the room comfort variable including an inner comfort band, an outer comfort band and a central comfort band, the central comfort band being within the outer comfort band and the inner comfort band being within the central comfort band, and said controlling demands the air flow to be switched off when a value of the room comfort variable lies in the inner comfort band and demands switching on the air flow when the value of the room comfort variable reaches the central comfort band, and a setpoint value related to the at least one room comfort variable of the air flow is changed by a signal from the regulator device to a pre-specified value to obtain an accelerated displacement of an actual value of the at least one room comfort variable into the inner comfort band, when an actual value of the at least one room comfort variable established by the regulator device for the at least one room lies outside the central comfort band.

2. The method as claimed in claim 1, wherein the air flow supplied to the at least one room is switched off by a flap arranged in the inlet duct of the at least one room and closed by a signal from the regulator device.

3. The method as claimed in claim 1, wherein the air flow supplied to the at least one room is switched off by the primary ventilation system being switched off by a signal of the regulator device.

4. The method as claimed in claim 1, comprising:

changing a setpoint value related to the at least one room comfort variable in an air postprocessing module assigned to the at least one room by the signal of the regulator device to the pre-specified value to obtain the accelerated displacement of the actual value of the at least one room comfort variable into the inner comfort band, when an actual value of the at least one room comfort variable established by the regulator device for the at least one room lies outside the central comfort band.

5. The method as claimed in claim 4, comprising:

switching off a ventilator arranged in an exhaust air duct of the at least one room when the at least one room comfort variable of the at least one room lies within the inner comfort band.

6. The method as claimed in claim 5, comprising:

switching off the primary ventilation system when, in all rooms able to be supplied by the primary ventilation system, each of the at least one room comfort variable lies within the inner comfort band, or when all of the rooms able to be supplied by the primary ventilation system are not occupied.

7. The method as claimed in claim 6, wherein the at least one room comfort variable regulated by the regulator device includes room temperature.

8. The method as claimed in claim 7, wherein the at least one room comfort variable regulated by the regulator device includes air quality.

9. The method as claimed in claim 8, wherein the at least one room comfort variable regulated by the regulator device includes air humidity.

10. The method as claimed in claim 1, wherein the supply of the air flow is controlled to bring about the required change to at least one-out-of-band room comfort level based on evaluation of the at least one room comfort variable corresponding with the comfort band assigned to each room.

* * * * *